United States Patent [19]

Lee et al.

[11] Patent Number: 5,213,725

[45] Date of Patent: May 25, 1993

[54] APPARATUS AND METHOD FOR COOLING AN EXTRUDED BLOWN FILM

[75] Inventors: Ron C. Lee, Bloomsbury; Mark Kirschner, Morristown, both of N.J.

[73] Assignee: The BOC Group, Inc., New Providence, N.J.

[21] Appl. No.: 848,791

[22] Filed: Mar. 10, 1992

[51] Int. Cl.⁵ ............................................. B29C 47/88
[52] U.S. Cl. .................................. 264/37; 264/28;
264/40.3; 264/40.6; 264/564; 425/72.1;
425/140; 425/143; 425/326.1; 425/378.1
[58] Field of Search .......... 264/37, 38, 40.3, 564–569,
264/28, 40.6; 425/72.1, 326.1, 140, 143, 378.1

[56] References Cited

U.S. PATENT DOCUMENTS

| | | |
|---|---|---|
| 3,065,501 | 11/1962 | Gasmire . |
| 3,170,011 | 2/1965 | Cheney et al. ................. 425/326.1 |
| 3,450,805 | 6/1969 | Chesser . |
| 3,488,809 | 1/1970 | James ................................ 264/564 |
| 3,505,440 | 4/1970 | Mason . |
| 3,505,442 | 4/1970 | Culpepper . |
| 3,520,020 | 7/1970 | Williams et al. . |
| 3,541,191 | 11/1970 | Thordarson ...................... 264/564 |
| 3,576,929 | 4/1971 | Turner et al. . |
| 3,618,169 | 11/1971 | Coast ................................. 264/565 |
| 3,666,849 | 5/1972 | Williams et al. . |
| 3,769,379 | 10/1973 | Hinrichs ........................... 264/40.6 |
| 3,789,093 | 1/1974 | Bose . |
| 3,888,961 | 6/1975 | Schonewald . |
| 4,069,282 | 1/1978 | Gutermuth et al. ............. 425/326.1 |
| 4,115,047 | 9/1978 | Stelmack ......................... 425/326.1 |
| 4,164,523 | 8/1979 | Hanning . |
| 4,176,155 | 11/1979 | Heisterkamp ................... 425/326.1 |
| 4,370,283 | 1/1983 | Arimatsu et al. . |
| 4,382,052 | 5/1983 | Arimatsu . |
| 4,389,366 | 6/1983 | Hoesslin et al. ................ 425/326.1 |
| 4,394,333 | 7/1983 | Fukushima et al. . |
| 4,406,845 | 10/1983 | Sakon et al. . |
| 4,472,131 | 10/1984 | Ryder . |
| 4,488,863 | 12/1984 | Collette . |
| 4,617,077 | 10/1986 | Giese et al. . |
| 4,623,497 | 11/1986 | Waters . |
| 4,883,631 | 11/1989 | Ajmera . |

FOREIGN PATENT DOCUMENTS

| | | | |
|---|---|---|---|
| 2737037 | 3/1979 | Fed. Rep. of Germany | ..... 425/72.1 |
| 2579517 | 10/1986 | France | ................................ 264/569 |

Primary Examiner—Jeffery Thurlow
Attorney, Agent, or Firm—David M. Rosenblum; Larry R. Cassett

[57] ABSTRACT

Apparatus and method for cooling an extruded blown film in which the interior surface of the thin film bubble is contacted with a gas which does not contain water vapor to thereby cool the extruded film. The apparatus and method may employ an enclosed circulation system to provide for the reuse of the gas through cooling with a liquid coolant such as liquid cryogen.

14 Claims, 4 Drawing Sheets

APPARATUS AND METHOD FOR COOLING AN EXTRUDED BLOWN FILM

TECHNICAL FIELD

The present invention is directed to an apparatus and method for cooling the interior surface of extruded plastic blown film, in the absence of water vapor, to improve the rate of production of the blown film.

BACKGROUND OF THE PRIOR ART

The technique of blown film extrusion is well known for the production of plastic films having a typical thickness between 10 and 300 microns. Plastics, such as low, linear low, and high density polyethylene (LDPE, LLDPE, HDPE) are extruded through a circular die to form a film. Air is introduced through the center of the die to maintain the film in the form of a bubble which increases the diameter of the film about two to six-fold, after which the bubble is collapsed onto rollers.

As the plastic moves away from the die, it begins to cool due to the near ambient temperature of the air blown on the outside surface of the bubble and, in some cases, inside the bubble. The rate of cooling of the bubble is a production rate limiting factor and therefore efforts have been made to increase the rate at which the bubble is cooled.

There are two methods for increasing the cooling rate of existing internal bubble cooling systems. The first is to increase the rate at which air is blown into the bubble. The second method is to lower the temperature of the air fed to the bubble. The first method is limited to airflow rates which do not adversely affect the stability of the bubble. As would be expected, an excessive airflow rate would make it difficult to maintain the shape of the bubble or could result in the collapse of the bubble.

The second method is limited by the physical changes that air undergoes at low temperatures. It has been estimated by thermal analysis, that to obtain a 20% increase in the production rate of blown films, it is necessary to cool the gas entering an internal bubble cooling system to about $-100°$ C., while maintaining the same flow rate. Quite obviously, when air is cooled to such low temperatures the water vapor present in the air will freeze. Existing refrigeration equipment cannot function effectively when such ice formation occurs, and in any case such ice will typically interfere with the surface finish of. It has been found that the air fed to the interior of the bubble can not be cooled to below the dew point of the air (typically about $10°$ C.) unless extraordinary steps are taken to reduce the amount of water vapor contained in the gas.

Thus, although significant cooling of the gas is desirable to increase production, there has yet to be developed a practical method of introducing extremely cold air into an internal bubble cooling system which is not hindered by the condensation and/or freezing of water vapor.

SUMMARY OF THE INVENTION

The present invention is generally directed to an apparatus and method for cooling the interior surface of an extruded plastic blown film to thereby obtain significantly greater production rates of the blown film than is commonly achieved using existing techniques. The process provides for injecting a cooled non-water vapor containing gas (hereinafter referred to as "non-water vapor gas") into the interior of the extruded film, typically in the form of a bubble, so that the cooled gas contacts the interior surface of the blown plastic film. The injected gas gives up its cooling duty to the bubble and is thereafter removed. All, or a portion, of the spent gas may then be cooled and recirculated to the bubble-making process. The exclusion of air or any other water vapor containing gas from the interior of the bubble allows the use of gases which have been cooled to well below previous temperature limits.

In particular, the present invention comprises means for contacting the interior surface of the bubble with a non-water vapor gas, preferably at low temperatures of less than $10°$ C. The cooling duty from the non-water vapor gas rapidly cools the thin film even at high feed rates. The transfer of the cooling duty from the cooled gas to the thin film raises the temperature of the resulting gas and this warmed spent gas is transported out of the bubble and may be discarded.

In a preferred embodiment of the invention, the spent gas is not entirely discarded. Instead, there is provided an enclosed circulation system in which the spent non-water vapor gas is recovered from the bubble and all or a portion recycled to a cooling means. The cooled gas is then sent back through the enclosed circulation system to the production facility for cooling the extruded plastic film. The production rate of the blown film may be increased by 20% or more over existing methods when employing the method of the present invention.

In a preferred embodiment of the invention, the cooled gas is obtained from a liquid coolant which, when mixed with a portion of the recirculated spent gas, forms a gas at a temperature corresponding to that at the inlet of the bubble of the blown film (e.g. $-100°$ C.). The liquid coolant is preferably a cryogenic liquid such as liquid nitrogen, liquid carbon dioxide, or a refrigerant such as Freon.

Means may be provided for generating a blown film cooling gas by injecting the coolant into the stream of the recycled spent gas to provide the motive force for circulating the resulting recooled gas to the extruded plastic film. The rate at which energy is removed from the blown film by the recooled gas is principally dependent on the rate at which the coolant enters the system. Spray nozzles may be used, for example, to inject the coolant into the stream of the recycled spent gas.

The preferred means for injecting the coolant into the system is an ejector which allows the coolant to vaporize and thermally mix with the spent gas. By excluding air from the inside of the blown film and circulation loop, a significant decrease in the temperature of the circulated gas can be obtained without the formation of condensation or ice crystals.

In one aspect of the invention, the amount of cooling needed to cool the spent gas to a desirable cooling temperature is balanced with the amount of motive force required to recirculate the cooled gas to the extruded film and the spent gas to the injecting means. The ejector is preferably supplied with a high pressure liquid cryogen, such as liquid nitrogen or liquid carbon dioxide, or a mixed liquid/gaseous cryogen. The mixed liquid/gaseous cryogen significantly increases the kinetic energy available to the system for recirculating the gas while only moderately affecting the available cooling duty.

Thus, in accordance with a preferred form of the invention the interior of the blown film is rapidly cooled by the injection of a low temperature gas in a manner which may increase the production rate of the thin film by up to 20% or more. In addition, since all water vapor containing gases are substantially eliminated from the system, the problems of condensation and freezing and consequential damage to the blown film are reduced or eliminated.

BRIEF DESCRIPTION OF THE DRAWINGS

The following drawings, except those identified as prior art, are illustrative of embodiments of the invention and are not intended to limit the invention as encompassed by the claims forming part of the application.

DETAILED DESCRIPTION OF THE INVENTION

Figure 1:
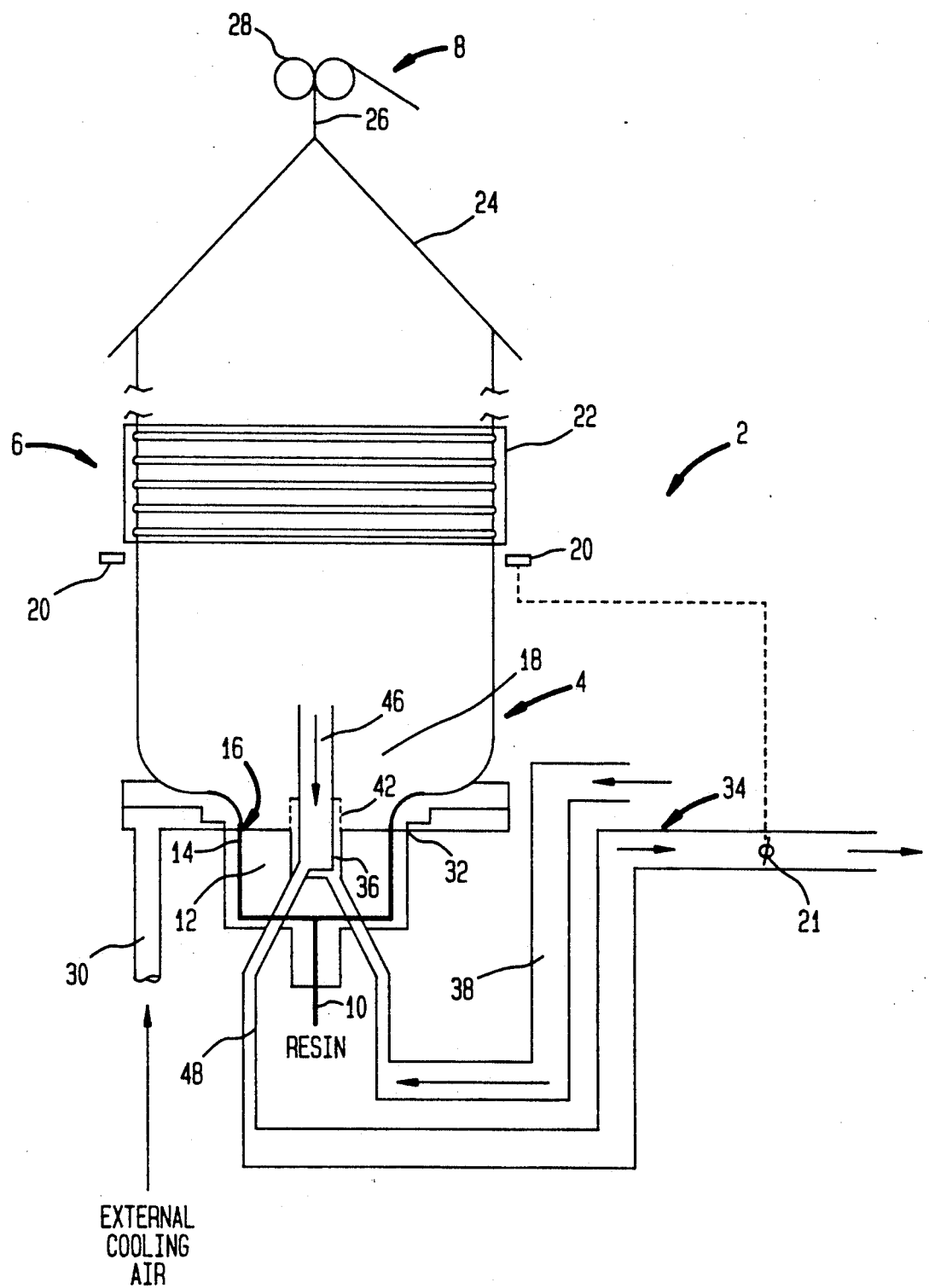
FIG. 1 is a schematic view of a typical blown film extrusion apparatus.

Referring to the drawings and particularly to FIG. 1 there is shown a known blown film extrusion device 2, comprised of a bubble forming section 4, a control section 6 and a thin film forming section 8.

The bubble forming section 4 includes an inlet 10 for receiving a suitable molten, plastic resin such as high or low density polyethylene. A pathway 14 is provided for the flow of the melted resin from the inlet to a narrow annular outlet 16 which forms the molten resin into a continuous bubble 18 when air is blown into the resin within the circumference of the annular outlet. The thickness of the resulting bubble is typically between 10 and 300 microns.

The control section 6 controls the size of the bubble. The control section 6 is provided with sensors 20 which detect the diameter of the bubble 18 and transmit a detectable signal to a damper 21 which adjusts internal bubble pressure which determines the size of the bubble.

The film forming section 8 includes a frame 24 which draws the sides of the bubble 18 inwardly so that the sides collapse on one another to form two layers of film 26. The film is passed through nip rolls 28 which draws the two layers of film upward and sends the compressed film to a storage facility (not shown).

Once the melted resin is extruded out of the annular outlet 16, the resulting bubble 18 must be cooled. Cooling occurs at least on the outer surface of the bubble and, in some blown film systems, on the inner surface as well. External cooling air is supplied through a conduit 30 into a nozzle 32 having openings which allow the cooled air to contact the surface of the bubble 18 around its circumference.

Internal cooling is provided by an open ended cooling system 34 comprised of an inlet 36 for receiving refrigerated or ambient temperature air from a source (not shown) through a conduit 38. A positive pressure is applied by a blower (not shown) and the flow is controlled by a damper (not shown). The pressure is sufficient to send the cooled air to a nozzle or diffuser plate 42, placed within the circumference of the resin extruded out of the outlet 16, where the flow is directed along the interior bubble surface.

The cooled air is circulated within the bubble 18 and loses its cooling duty to the interior bubble surface. The resulting warmer air (spent gas) is removed from the bubble 18 through an outlet 46 and out of the bubble forming apparatus via a conduit 48 through a damper 21 and a blower (not shown).

The rate at which energy is removed from the bubble (i.e. cooling) determines the rate at which the thin film can be extruded. Energy removal may be viewed as the product of the mass flow of the plastic and the energy that must be removed per unit mass of plastic. For example, the energy removal rate of the plastic in the prior art system of FIG. 1 may be 30 kW based on a mass flow rate of plastic of 0.075 kg/sec (600 lb/hr) and an amount of energy to be removed per unit mass of plastic of about 400 kJ/kg.

It can be assumed that about ⅓ (10 kW) of the energy removed will be from inside the bubble and the remaining ⅔ (20 kW) from outside the bubble. Since the outer cooling load remains largely the same regardless of the type of internal cooling system employed, any attempt to increase the mass flow rate of plastic will require significantly greater cooling from the gas present in the inside of the bubble.

For example, if a 30% increase in film production is desired (equivalent to an energy removal rate of 39 kW for the above example), the amount of energy removed from the inside of the bubble will have to increase from 10 kW as in the prior art system described above to 19 kW (a 90% increase). The removal of such greater amounts of energy can be accomplished by having an internal bubble cooling system which can operate at lower temperatures than is customary. In addition, having a system in which water vapor is not present, preferably an enclosed circulation system, eliminates the condensation and/or freezing problems associated with known internal bubble cooling systems operating at low temperatures. Accordingly, the present invention can produce blown films at varying rates of production without concern for the formation of water droplets or ice crystals within the bubble.

Figure 2:
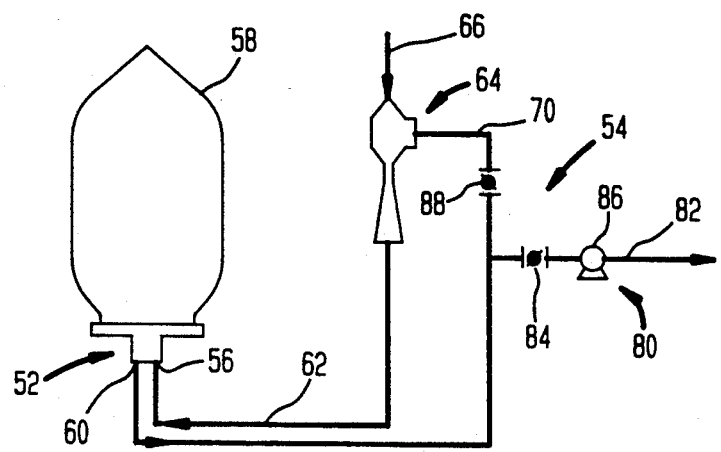
FIG. 2 is a schematic view of one embodiment of the invention shown in conjunction with a blown film extrusion apparatus of the type shown in FIG. 1.
Figure 3:
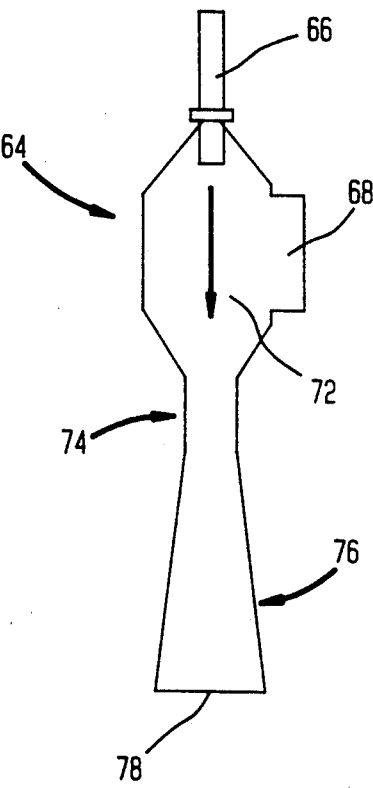
FIG. 3 is a side view in cross-section of an ejector used in the present invention for thermally mixing and circulating a liquid coolant or liquid/gas mixture with a recirculated spent gas.

Referring to FIGS. 2 and 3, there is shown an embodiment of the internal bubble cooling apparatus of the present invention employing an ejector for distributing the gaseous coolant within the bubble. An extrusion device 52 of the same type shown and described in connection with prior art FIG. 1 is provided with a cooling system in the form of an enclosed circulation system, shown generally by numeral 54. The cooling system 54 includes an inlet 56 for injecting a cooled gas into the bubble 58 and an outlet 60 for removing spent gas which has given its cooling duty to the inner surface of the bubble 58.

The cooled gas, which is transmitted to the bubble 58 via a conduit 62, is generated within an ejector 64. The ejector 64 combines a liquid coolant, such as a liquid cryogen (e.g. liquid nitrogen or liquid carbon dioxide) or a mixture of liquid and gaseous cryogen, from a first inlet 66 and the spent gas in a manner which provides both cooling and motive force to the spent gas. There is thus generated a stream of cooled gas having sufficient pressure to enter the bubble 58 and cool the inner surface thereof.

Referring to FIG. 3, the ejector 64 includes the first inlet 66 for receiving the coolant, such as liquid nitrogen, and a second inlet 68 for receiving the spent gas (e.g. nitrogen gas) which is recycled from the bubble 58 via a conduit 70. A chamber 72 receives the liquid coolant from the first inlet 66 and the spent gas from the second inlet 68 and allows thermal mixing thereof. The liquid coolant vaporizes and provides both cooling and motive force to the spent gas to thereby form a pressured stream of cooled gas for transmission to the inlet 56.

The ejector 64 has a parallel flow region 74 which serves to enhance the intimate thermal and momentum mixing of the liquid coolant and spent gas. The mixed gas is then sent to a diffuser section 76 which allows the mixed gas to increase its pressure prior to exiting the ejector 64 through an exit port 78.

It is preferred that the ejector 64 provide as much of the recirculation energy as possible (i.e. The draft at a particular flow rate). It is therefore necessary to consider the draft generated by the ejector 64. The draft is measured by the difference in pressure between the spent gas entering the chamber 72 via the second inlet 68 and the mixed gas exiting through port 78.

The majority of the draft requirements for an internal bubble cooling system are associated with the pressure drop entering and exiting the bubble. For a prior art system as shown in FIG. 1, the pressure drop into the bubble can be as much as 20" water column (w.c.) (5,000 Pa) and the pressure drop out of the bubble as much as 30" w.c. (7,500 Pa) However, it is known from theory that pressure drop increases proportional to the square of the flow rate of air and directly proportional to the absolute air temperature. Therefore, an internal bubble cooling system that utilizes the method of the present invention can have significantly different draft requirements compared to the prior art. For example, with a gas inlet temperature of −125° C. (compared to about 20° C. for the prior art) and a cooling ga flow rate of about 60% of the prior art flow rate, the total draft is reduced from 50" w.c. (12,500 pa) to 16" w.c. (4,000 Pa) while still achieving a 20-30% production increase.

Referring again to FIG. 2, the system eliminates from the enclosed circulation system a quantity of spent gas equal to the amount of the coolant entering the system through the ejector 64. Accordingly, the system is provided with a vent means 80 including a conduit 82 for transporting the gas to be vented out of the conduit 70 via a control damper 84 and a blower 86.

The control damper 84 is coupled to the bubble size sensors 20 as shown best in FIG. 1. The sensors 20 maintain the pressure within the bubble so as to maintain the desired blow-up ratio. For the embodiment shown in FIG. 2, it is not possible to balance the exhaust and pressure requirements for the bubble without the use of the control damper 84 and the blower 86. A control damper 88 is also provided on the main conduit 70 to control the rate at which the spent gas is recycled back to the ejector 64. In accordance with the present invention, it is evident that compared to the prior art internal bubble cooling systems, the number of required blowers is reduced from two to one and the flow rate the blowers must handle is significantly reduced as well (e.g. by ½ to ¼).

Due to the operating characteristics of ejectors, as the mass ratio of spent gas to the coolant entering the ejector increases, the pressure boost or draft produced by the ejector decreases. This behavior, coupled with large draft requirements in some blown film installations, may produce situations where the ejector 64 cannot provide the total pressure boost. In this event, the blower 86 is preferably placed in the mainstream of the recycled flow to assist the ejector 64 in handling the draft requirement.

Figure 4:
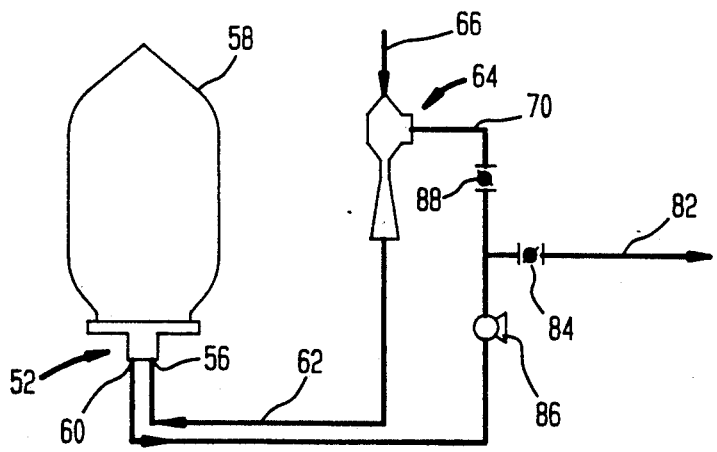
FIG. 4 is a schematic view of another embodiment of the invention shown in conjunction with a blown film extrusion apparatus of the type shown in FIG. 1.

Referring to FIG. 4, there is shown an embodiment of the invention in which the blower 86 is positioned within the enclosed circulation system in a manner which assists the ejector 64 in providing the necessary pressure boost for circulating the spent gas. The blower 86 is therefore positioned along the conduit 70. Control dampers 84 and 88 function as described in connection with FIG. 2.

For this embodiment of the invention, there is also a reduction of one blower compared to the prior art. However, in this embodiment, the blower must handle the full flow rate from the bubble rather than only the amount vented to the atmosphere. In the embodiment shown in FIG. 4, an ejector is not required for circulation because the blower 86 can be properly sized to provide the full pressure boost required. In this case, the ejector can be replaced with spray nozzles fed by the coolant and directed into the conduit 70.

In another embodiment of the invention, the pressure boost requirements for the ejector are essentially eliminated by positioning the ejector within the bubble. As a result, the ejector can provide a much broader range of mass ratios of spent gas to coolant (up to at least 3:1) without regard to the pressure boost.

Figure 5:
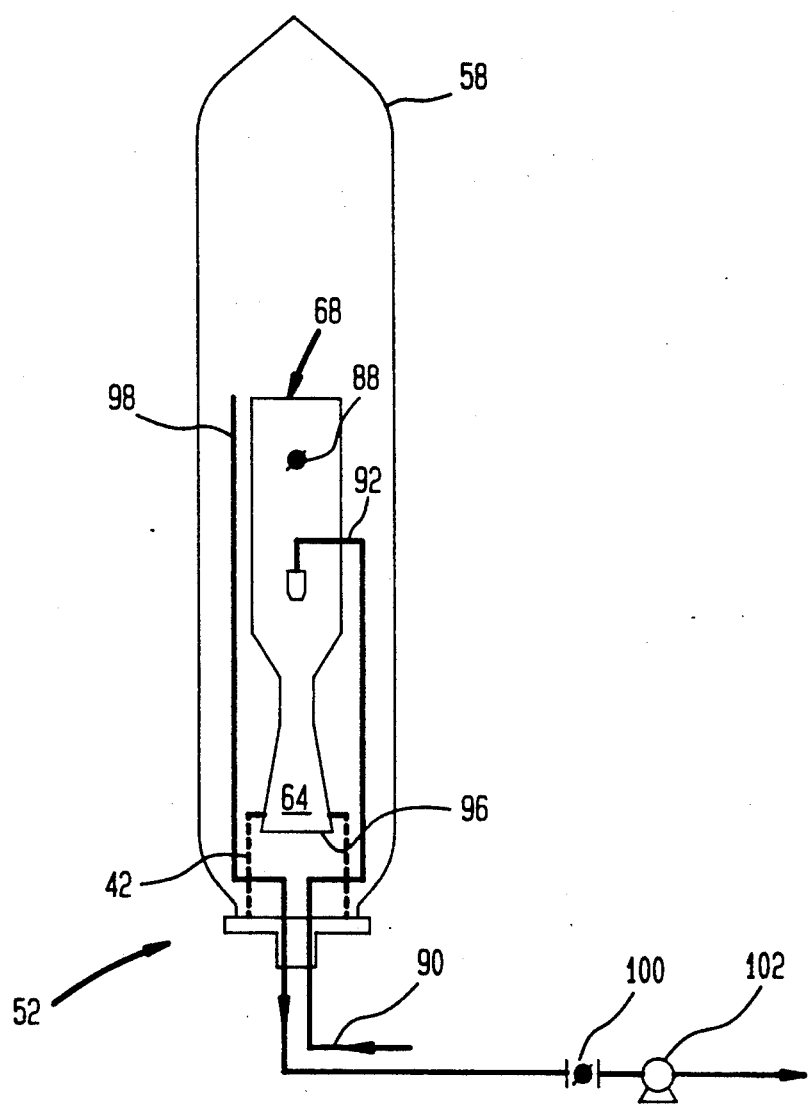
FIG. 5 is a schematic view of still another embodiment of the invention in which an ejector is placed within the bubble of the thin film.

Referring to FIG. 5, an ejector 64 is shown within the bubble 58. A coolant is provided to the ejector 64 via a conduit 90. The line 90 extends to the upper portion of the ejector 64 and provides a pathway for the flow of the coolant to a first inlet 92. The spent gas enters the ejector 64 through a second inlet 68 while the mixed cooled stream for cooling the bubble leaves the ejector 64 through an exit port 96. The mixed stream, upon leaving the exit port 96, is directed (as in the prior art shown in FIG. 1) to a nozzle or diffuser plate 42, where the flow is directed along the inner surface of the bubble until it is drawn into the second inlet 68. Control damper 88 is provided within second inlet 68 to control the rate at which spent gas is recycled back to ejector 64.

The vent gas is removed from the bubble 58 through a conduit 98, which extends upward into the bubble to ensure withdrawal of the warmer spent gas by a blower 102. Control of the bubble internal pressure is made, as in the prior art, by a control damper 100 coupled to a size sensor 20 (see FIG. 1). The amount of vent gas expelled from the system through the conduit 98 is substantially equal to the coolant added to the system through the conduit 90.

As previously described, because the coolant is mixed with the spent gas, the actual gas inlet temperature to the blown film will vary depending on the mass ratio of the spent gas to the incoming coolant. The energy removal rate provided by the cold gas for the plastic film is governed by the flow rate of the coolant into the ejector, however the inlet temperature of the cold gas as it enters the bubble and the total inlet flow rate is controlled by the amount of spent gas which is recirculated and mixed with the coolant in the ejector.

Figure 6:
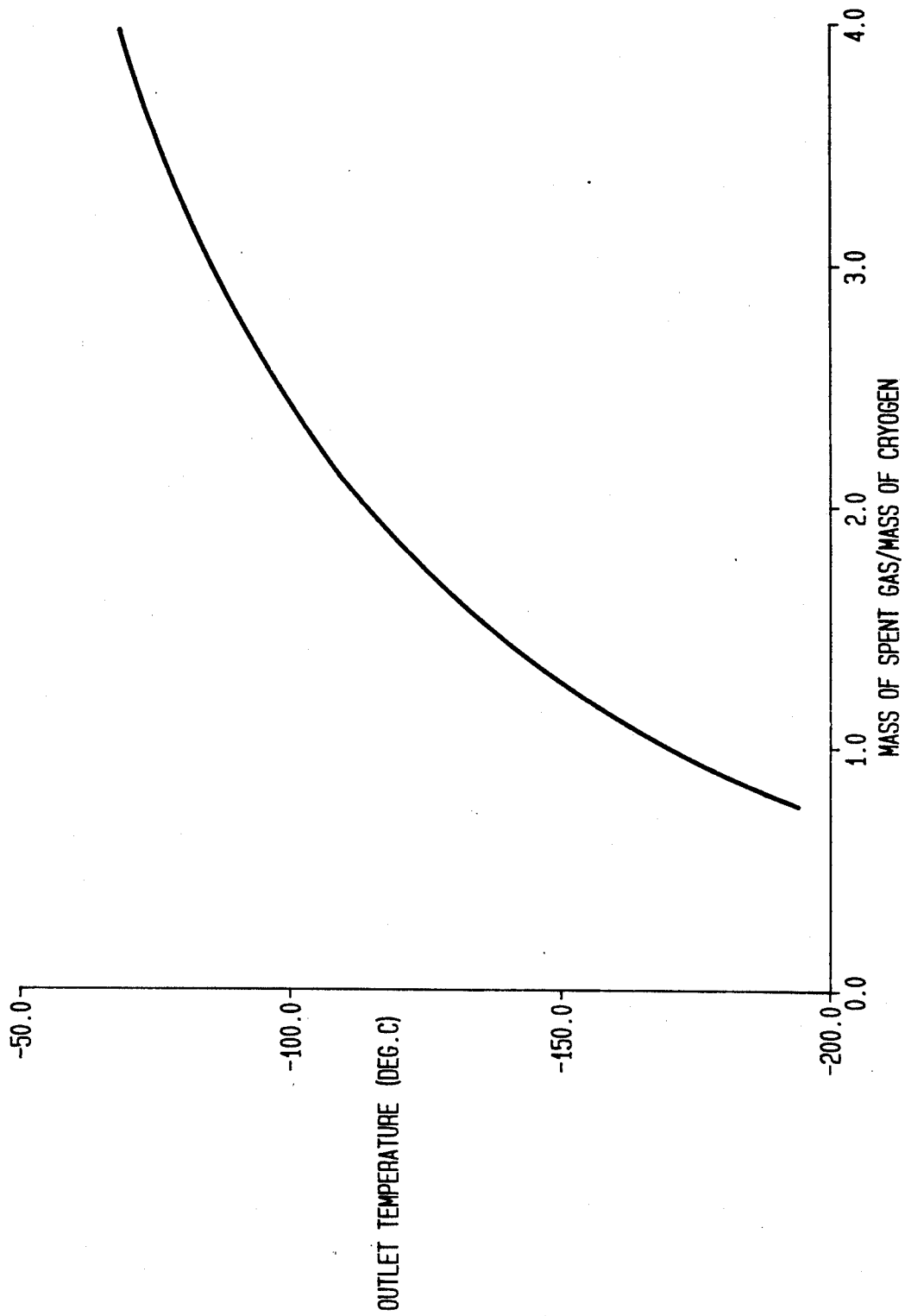
FIG. 6 is a graph comparing the temperatures of the cooled gas to the mass ratio of the spent gas/coolant for a given energy level of incoming coolant.

Referring to FIG. 6, there is illustrated a typical graph for liquid nitrogen coolant which shows that the outlet temperature of the mixed stream is a function of the mass ratio of the spent gas to the injected coolant. For a given amount of cooling (determined by the flow rate of the coolant), the product of the mass flow rate of cold gas entering the bubble multiplied by the temperature difference between the inlet and outlet gas streams will be constant. Therefore, small mass ratios (with correspondingly small mixed gas flow rates) will have relatively cold inlet temperatures while large mass ratios (with large mixed gas flow rates) will have relatively warmer inlet temperatures. There are several advantages to operating an internal bubble cooling system at low flow rates, including increased bubble stability and lower draft requirements. However, because of the mechanical problems associated with operating at very low temperatures (e.g. less than $-100°$ C.), it is not always possible to operate the system at mass ratios as low as 1:1.

The system of the present invention provides for rapid cooling of the extruded film which may be sufficient to increase production rate over known air cooled systems by up to 20% or more. The change in the pressure drop caused by a change in the mass flow rate can be handled by either an ejector alone or with the assistance of an in-line blower.

EXAMPLE

An embodiment of the invention in accordance with FIG. 2 is employed in this example. 0.057 kg/s of liquid nitrogen at a pressure of 0.31-1.24 MPa (45-180) psia and 0.114 kg/s of spent nitrogen gas is fed to an ejector of the type shown and described in connection with FIG. 3. The total mixed feed of 0.171 kg/s having a temperature of from $-134°$ to $-118°$ C. is fed to the inlet of a standard blown film internal bubble cooling system of the type shown in FIG. 1. The ejector will provide from 7" to 15" w.c. (1,750 to 3,750 Pa) draft. The spent gas is removed from the outlet at a temperature of 0° C. The rate of production of the film is 0.0975 kg/s (774 lb./hr.) and would exceed known air cooling systems by about 20 to 30%.

We claim:

1. Apparatus for cooling an extruded blown film comprising:

contacting means for contacting an interior surface of a bubble of the extruded blown film with a cryogenic gas to thereby cool the extruded blown film and form a spent gas from the cryogenic gas heated by the cooling of the extruded blown film; and an enclosed circulation system including means for recovering the spent gas from the bubble of the extruded blown film and cryogenic gas generating means for generating the cryogenic gas;

the cryogenic gas generating means having a first inlet for the intake of a coolant selected from a group consisting of a liquid cryogen and a mixture of a liquid and gaseous cryogen, a second inlet in communication with the spent gas recovery means for the intake of the the spent gas, a chamber, separate from and not bound by the bubble of the extruded blown film, in communication with the first and second inlets for thermally mixing the coolant and the spent gas to form the cryogenic gas and an outlet of the chamber in communication with the contacting means for supplying the contacting means with the cryogenic gas.

2. The apparatus of claim 1 wherein the cooled gas generating means comprises an ejector.

3. The apparatus of claim 1 wherein the cryogen is selected from the group consisting of liquid nitrogen and liquid carbon dioxide.

4. The apparatus of claim 2 wherein the ejector is located within the bubble of the blown film.

5. The apparatus of claim 1 further comprising means for venting a portion of the spent gas out of the enclosed circulation system.

6. The apparatus of claim 5 wherein the vent means comprises a third conduit in flow communication with the second conduit and a first damper for adjusting pressure within the bubble of the blown film.

7. The apparatus of claim 6 wherein the second conduit includes a second damper for controlling the rate of flow of the spent gas through the second conduit.

8. The apparatus of claim 7 wherein the cooled gas generating means comprises an ejector, said vent means further comprising a blower means to control the pressure within the bubble of the blown film.

9. The apparatus of claim 7 wherein the second conduit further comprises a blower means for increasing the rate of flow of the spent gas through the second conduit.

10. The apparatus of claim 9 wherein the cooled gas generating means comprises an ejector.

11. A method of cooling an extruded blown film comprising:

contacting an interior surface of a bubble of the extruded blown film with a cryogenic gas to thereby cool the extruded blown film and form a spent gas from the cryogenic gas heated by the cooling of the extruded blown film;

recovering the spent gas from the bubble of the extruded blown film;

forming the cryogenic gas by mixing in a chamber, separate from and not bound by the bubble of the extruded blown film the spent gas recovered from the bubble of the blown film and a coolant selected from a group consisting of a liquid cryogen and a mixture of a liquid and gaseous cryogen; and introducing the cryogenic gas from the chamber into the bubble of the extruded blown film.

12. The method of claim 11 further comprising venting a portion of the spent gas out of the enclosed circulation system.

13. A method of claim 11 further comprising controlling the rate of flow of the cryogenic gas.

14. The method of claim 11 further comprising controlling pressure within the bubble of the blown film.

* * * * *